UNITED STATES PATENT OFFICE.

BENJAMIN G. CARTER, OF OATLANDS, VIRGINIA.

IMPROVEMENT IN FERTILIZING COMPOUNDS.

Specification forming part of Letters Patent No. 154,017, dated August 11, 1874; application filed July 22, 1874.

*To all whom it may concern:*

Be it known that I, BENJ. G. CARTER, of Oatlands, in the county of Loudoun and State of Virginia, have invented a new and Improved Fertilizing Compound; and I do hereby declare that the following is a full, clear, and exact description of the same.

The invention relates to fertilizing compounds that are intended to take the place of stable manure, yielding to the plant all those elements of its composition in which the soil is liable to be deficient. It consists in a commixture of ingredients, and in about the proportions hereinafter described.

I take, preferably—

| | |
|---|---|
| Peruvian guano | 500 lbs. |
| Orchilla guano | 300 lbs. |
| Dissolved bone | 200 lbs. |
| Wood-ashes | 300 lbs. |
| Soda | 50 lbs. |
| Ground plaster | 650 lbs. |
| One ton of | 2,000 lbs. |

These ingredients furnish, as food to the plants, ammonia, phosphate of lime, potash, soda, and sulphate of lime in such proportions that while a sufficiency of each will be available during the first crop the remainder will gradually be prepared by natural agencies for plant-food in subsequent years and for succeeding crops. Indeed, where applied to a grain crop with a liberal hand, even upon the poorest land, a luxuriant crop of grass may be confidently anticipated.

All farmers recognize grass as the basis and the only legitimate forerunner of permanent improvement, and with this a high state of tillage is always attainable in a few years. Of course the quantity of my fertilizer per acre must be graduated according to the condition of the soil and the character of the crop, while the proportions may be considerably varied, still accomplishing the object of my invention, which is to furnish these vital requisites to vegetable growth with the greatest possible economy to the farmer.

Having thus described my invention, what I claim as new is—

A fertilizing compound formed of guano, dissolved bone, wood-ashes, soda, and ground plaster, in about the proportions specified.

BENJAMIN G. CARTER.

Witnesses:
HENRY MAFFETT,
JAMES S. ODEN.